US009385558B2

(12) United States Patent
Kawasaki

(10) Patent No.: US 9,385,558 B2
(45) Date of Patent: Jul. 5, 2016

(54) ELECTRICITY SUPPLY SYSTEM FOR ELECTRIC AUTOMOBILE, AND ELECTRIC AUTOMOBILE AND POWER SUPPLY DEVICE USED IN SAID SYSTEM

(75) Inventor: Akihisa Kawasaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 443 days.

(21) Appl. No.: 13/876,925

(22) PCT Filed: Sep. 30, 2011

(86) PCT No.: PCT/JP2011/005543
§ 371 (c)(1),
(2), (4) Date: Mar. 29, 2013

(87) PCT Pub. No.: WO2012/042902
PCT Pub. Date: Apr. 5, 2012

(65) Prior Publication Data
US 2013/0181669 A1    Jul. 18, 2013

(30) Foreign Application Priority Data

Oct. 1, 2010 (JP) ................................. 2010-223759

(51) Int. Cl.
*H02J 7/00* (2006.01)
*H02J 7/14* (2006.01)
(Continued)

(52) U.S. Cl.
CPC ............... *H02J 7/025* (2013.01); *B60L 3/0046* (2013.01); *B60L 11/14* (2013.01); *B60L 11/182* (2013.01);
(Continued)

(58) Field of Classification Search
USPC .......... 320/104, 108, 109, 160, 107; 307/104, 307/80, 10.1
See application file for complete search history.

(56) References Cited

U.S. PATENT DOCUMENTS 5,341,083 A * 8/1994 Klontz ................ B60L 11/1816
320/109
7,602,143 B2 * 10/2009 Capizzo ............... B60K 15/063
104/34
(Continued)

FOREIGN PATENT DOCUMENTS

CN    101572421 A    11/2009
CN    101689698 A    3/2010
(Continued)

OTHER PUBLICATIONS

English translation of the Search Report for Chinese Application No. 201180045412.1 dated Sep. 30, 2014.
(Continued)

*Primary Examiner* — Alexis A Boateng
(74) *Attorney, Agent, or Firm* — Pearne & Gordon LLP

(57) ABSTRACT

Provided are an electric automobile to which a power supply device supplies power, and an electricity supply system capable of accurately associating the power supply device and the electric automobile carrying out communication therewith. A power supply-side control unit (24) controls such that electricity that a power supply unit (21) supplies reaches a first electricity quantity Pa before a power supply-side communications unit (23) receives a request signal from a vehicle-side communications unit (43), and controls such that electricity that the power supply unit (21) supplies reaches a second electricity quantity Pb, which is greater than the first electricity quantity Pa, after the power supply-side communications unit (23) receives the request signal from the vehicle-side communications unit (43). The vehicle-side communications unit (43) activates on the basis of the first electricity quantity Pa received from the power supply unit (21) of a power supply device (2).

6 Claims, 10 Drawing Sheets

(51) Int. Cl.
  H02J 7/02       (2016.01)
  B60L 11/18      (2006.01)
  B60M 7/00       (2006.01)
  B60L 3/00       (2006.01)
  B60L 11/14      (2006.01)
  H01M 10/42      (2006.01)
  H02J 5/00       (2016.01)
  H01M 10/44      (2006.01)

(52) U.S. Cl.
  CPC ......... B60L 11/1805 (2013.01); B60L 11/1838 (2013.01); B60L 11/1846 (2013.01); B60L 11/1861 (2013.01); B60M 7/003 (2013.01); B60L 2210/40 (2013.01); B60L 2240/80 (2013.01); H01M 10/44 (2013.01); H01M 2010/4278 (2013.01); H01M 2220/20 (2013.01); H02J 5/005 (2013.01); Y02T 10/70 (2013.01); Y02T 10/705 (2013.01); Y02T 10/7005 (2013.01); Y02T 10/7044 (2013.01); Y02T 10/7072 (2013.01); Y02T 10/7077 (2013.01); Y02T 10/7241 (2013.01); Y02T 90/121 (2013.01); Y02T 90/122 (2013.01); Y02T 90/127 (2013.01); Y02T 90/128 (2013.01); Y02T 90/14 (2013.01); Y02T 90/16 (2013.01); Y02T 90/163 (2013.01); Y02T 90/169 (2013.01); Y04S 30/14 (2013.01)

(56) References Cited

U.S. PATENT DOCUMENTS

| | | | |
|---|---|---|---|
| 8,115,449 B2 | 2/2012 | Jung | |
| 8,178,995 B2 * | 5/2012 | Amano | B60L 11/182 307/104 |
| 2009/0001930 A1 | 1/2009 | Pohjonen | |
| 2009/0267558 A1 | 10/2009 | Jung | |
| 2010/0017249 A1 * | 1/2010 | Fincham | B60L 3/12 705/412 |
| 2010/0117596 A1 * | 5/2010 | Cook | B60L 11/182 320/108 |
| 2010/0161217 A1 * | 6/2010 | Yamamoto | B60L 3/0046 701/408 |
| 2010/0225271 A1 * | 9/2010 | Oyobe | B60L 5/005 320/108 |
| 2010/0295514 A1 * | 11/2010 | Burlak | H02H 3/12 320/160 |
| 2011/0015821 A1 * | 1/2011 | Tran | H02J 7/0027 701/31.4 |
| 2011/0032110 A1 * | 2/2011 | Taguchi | B60L 3/12 340/636.1 |
| 2011/0074351 A1 * | 3/2011 | Bianco | B60L 11/1816 320/109 |
| 2011/0077809 A1 * | 3/2011 | Leary | B60L 11/1824 701/22 |
| 2012/0005125 A1 * | 1/2012 | Jammer | B60L 11/1848 705/412 |

FOREIGN PATENT DOCUMENTS

| | | |
|---|---|---|
| JP | 08-126120 A | 5/1996 |
| JP | 2005-073313 A | 3/2005 |
| JP | 2010-093957 A | 4/2010 |
| JP | 2010-167898 A | 8/2010 |
| JP | 2010-187495 A | 8/2010 |

OTHER PUBLICATIONS

International Search Report for PCT/JP2011/005543 dated Dec. 27, 2011.

* cited by examiner

ELECTRICITY SUPPLY SYSTEM FOR ELECTRIC AUTOMOBILE, AND ELECTRIC AUTOMOBILE AND POWER SUPPLY DEVICE USED IN SAID SYSTEM

TECHNICAL FIELD

The present invention relates to a power supply system for an electric vehicle which supplies power from a power supply apparatus to an electric vehicle in a non-contact manner, and an electric vehicle and a power supply apparatus which are used for the power supply system.

BACKGROUND ART

A power supply system for an electric vehicle is known which includes an electric vehicle and a power supply apparatus that supplies power to the electric vehicle in a non-contact manner.

An electric vehicle includes a communication section that transmits a signal (hereinafter, referred to as a "request signal") for requesting for a supply of power and a power receiving section (power receiving coil) that can be supplied with power in a non-contact manner. A power supply apparatus includes a power supply section (power supply coil) that can supply power in a non-contact manner and a control section that controls the supply of power to the power supply coil in response to a request signal transmitted from an electric vehicle. For example, PTL 1 is known as a related art document.

CITATION LIST

Patent Literature

PTL 1
Japanese Patent Application Laid-Open No. 2005-73313

SUMMARY OF INVENTION

Technical Problem

In a conventional power supply system, it is not considered that multiple electric vehicles are present around a power supply apparatus.

Accordingly, an electric vehicle located above the power supply coil may be different from an electric vehicle having transmitted a request signal.

For example, there is a possibility that the power supply apparatus receives a request signal from an electric vehicle not located above the power supply coil and supplies power to an electric vehicle located above the power supply coil in response to the received request signal.

At this time, when it is necessary to charge the rechargeable battery of the electric vehicle having transmitted the request signal and the rechargeable battery of the electric vehicle located above the power supply coil is fully charged, the rechargeable battery of the electric vehicle located above the power supply coil may be overcharged, thereby causing problems such as destruction and overheating of the rechargeable battery.

In a system in which an electric vehicle supplied with power is specified through communications between the electric vehicle and a power supply apparatus to bill the electric vehicle, when an electric vehicle located above the power supply coil is different from an electric vehicle having transmitted a request signal, there is a problem in that an electric vehicle not supplied with power is erroneously billed.

An object of the present invention is to provide a power supply system which can accurately associate an electric vehicle supplied with power from a power supply apparatus, with an electric vehicle communicating with the power supply apparatus.

Solution to Problem

According to an aspect of the present invention, there is provided a power supply system for an electric vehicle that supplies power from a power supply apparatus to an electric vehicle in a non-contact manner, wherein the electric vehicle includes a vehicle-side communication section that wirelessly communicates with the power supply apparatus, a power receiving section that is supplied with power from the power supply apparatus in a non-contact manner, and a power storage section that stores power received by the power receiving section, wherein the power supply apparatus includes a vehicle detecting section that detects the entrance of the electric vehicle to a predetermined area, a power supply-side communication section that wirelessly communicates with the vehicle-side communication section of the electric vehicle, a power supply section that supplies power to the power receiving section of the electric vehicle in a non-contact manner, and a power supply-side control section that controls the power supply section, and wherein the power supply-side control section performs a control for causing the power supply section to supply power of a first power value when the vehicle detecting section detects the entrance of the electric vehicle to the predetermined area, and performs a control for causing the power supply section to supply power of a second power value greater than the first power value when it is determined that a communication is set up between the power supply-side communication section and the vehicle-side communication section in a state where the power supply section is supplying power of the first power value.

According to another aspect of the present invention, there is provided an electric vehicle that is supplied with power from a power supply apparatus in a non-contact manner, including: a vehicle-side communication section that wirelessly communicates with the power supply apparatus; a power receiving section that is supplied with power from the power supply apparatus in a non-contact manner; and a power storage section that stores power received by the power receiving section, wherein the vehicle-side communication section transmits a request signal to the power supply apparatus in a state where the power receiving section is being supplied with power of a first power value from the power supply apparatus, and wherein the power storage section stores power of a second power value which is greater than the first power value and which is supplied from the power supply apparatus to the power receiving section after transmitting the request signal.

According to still another aspect of the present invention, there is provided a power supply apparatus that supplies power to an electric vehicle in a non-contact manner, including: a vehicle detecting section that detects the entrance of the electric vehicle to a predetermined area; a power supply-side communication section that wirelessly communicates with the electric vehicle; a power supply section that supplies power to the electric vehicle in a non-contact manner; and a power supply-side control section that controls the power supply section, wherein the power supply-side control section performs a control for causing the power supply section to supply power of a first power value when the vehicle detecting section detects the entrance of the electric vehicle to the predetermined area, and performs a control for causing the power supply section to supply power of a second power value greater than the first power value when the power supply-side communication section receives a request signal from the electric vehicle in a state where the power supply section is supplying power of the first power value.

Advantageous Effects of Invention

According to the aspects of the present invention, since the vehicle-side communication section is started up with the first power value supplied from the power supply section of the power supply apparatus and transmits a request signal to the power supply apparatus, it is possible to accurately associate an electric vehicle supplied with power from the power supply section of the power supply apparatus, with an electric vehicle communicating with the power supply apparatus.

DESCRIPTION OF EMBODIMENTS (Embodiment 1)

Figure 1:
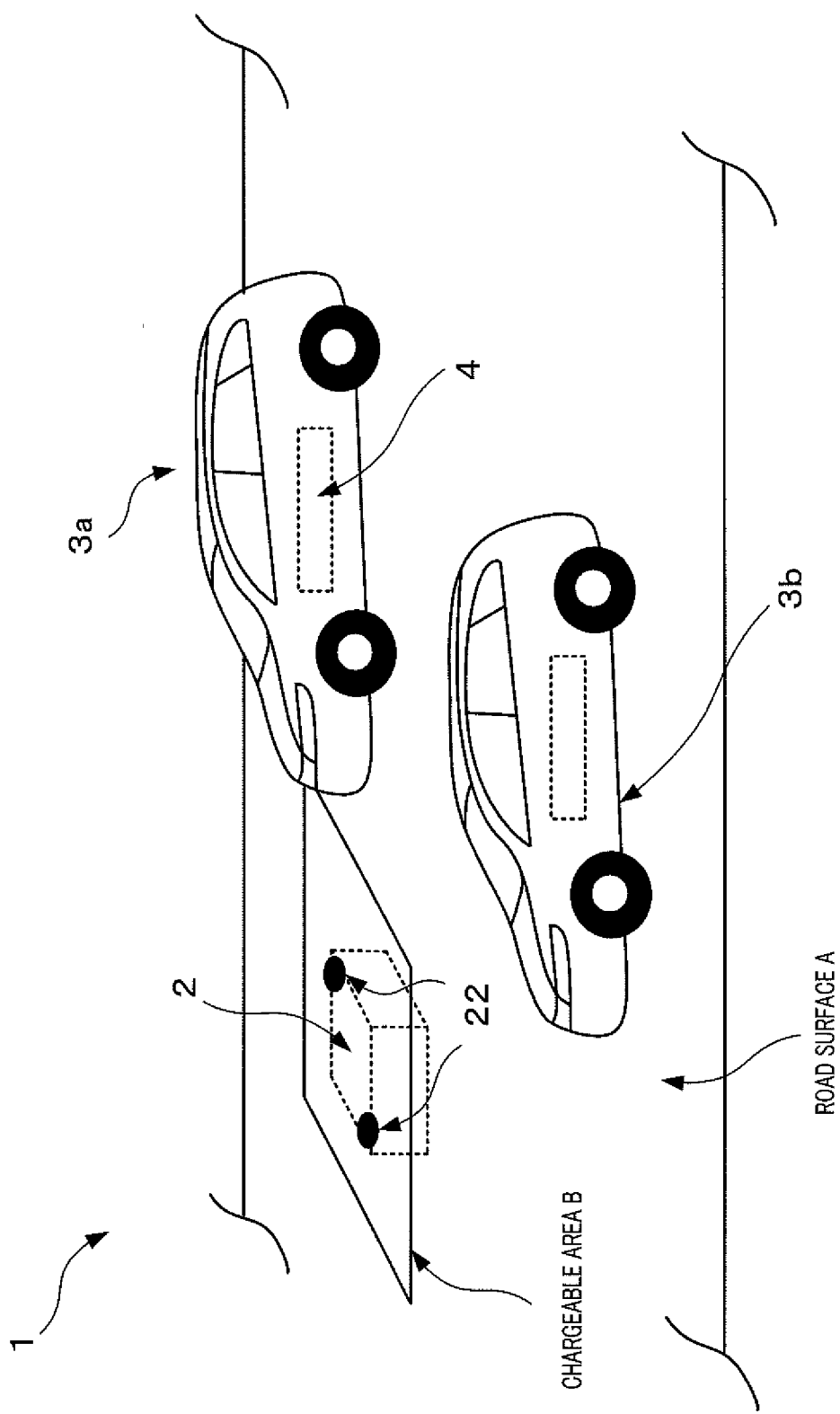
FIG. 1 is a diagram illustrating the configuration of a power supply system for an electric vehicle according to Embodiment 1 of the present invention.
Figure 2:
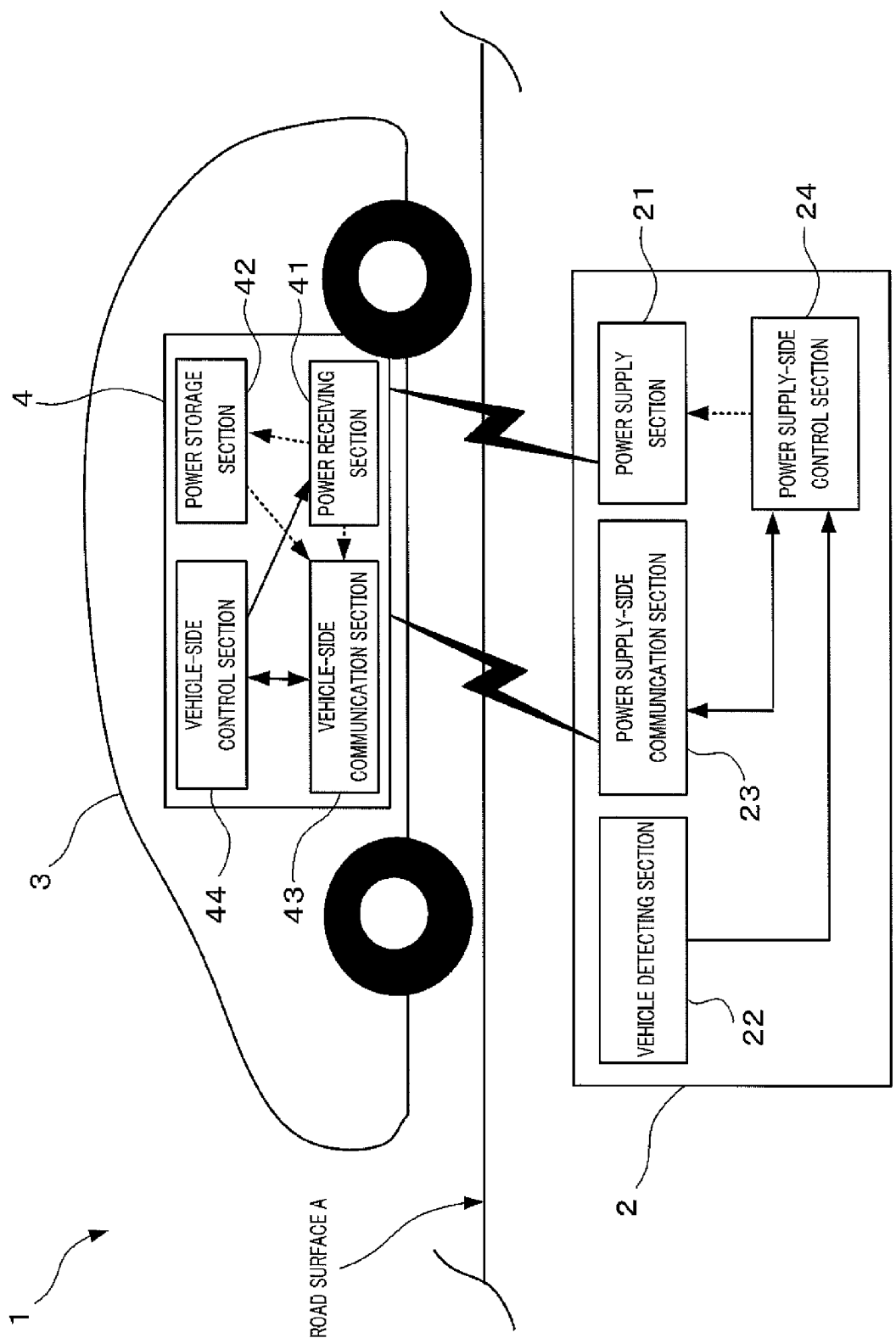
FIG. 2 is a block diagram illustrating the configuration of the power supply system for an electric vehicle according to Embodiment 1 of the present invention.

Hereinafter, a power supply system for an electric vehicle according to an embodiment of the present invention will be described with reference to FIGS. 1 and 2. FIG. 1 is a diagram illustrating the configuration of a power supply system for an electric vehicle according to Embodiment 1 of the present invention. FIG. 2 is a block diagram illustrating the configuration of the power supply system for an electric vehicle. In FIG. 2, a solid arrow represents the flow of signals and a dotted arrow represents the flow of power.

As shown in FIG. 1, the power supply system for an electric vehicle according to an embodiment of the present invention includes power supply apparatus 2 installed in a road and electric vehicle 3 supplied with power from power supply apparatus 2. More specifically, electric vehicle 3 is charged with power supplied from power supply apparatus 2 through the use of power receiving apparatus 4.

Electric vehicle 3 in Embodiment 1 of the present invention is a vehicle obtaining a thrust by electricity and includes an electric motor that generates, with power, a driving force transmitted to wheels. The electric motor is driven with power of power storage section 42 (see FIG. 2). The power stored in the power storage section 42 is supplied from the outside of electric vehicle 3.

Examples of electric vehicle 3 in the present invention include an EV (Electric Vehicle) that is driven using only an electric motor and a plug-in hybrid vehicle that is driven using an engine and an electric motor and that enables power storage section 42 to be supplied with power from a power supply outside electric vehicle 3.

Detailed configurations of power supply apparatus 2 and power receiving apparatus 4 will be described below.

Power supply apparatus 2 includes power supply section 21 that supplies power to power receiving section 41 of electric vehicle 3 in a non-contact manner, vehicle detecting section 22 that detects the entrance of electric vehicle 3 to a predetermined range on a road, power supply-side communication section 23 that communicates with electric vehicle 3, and power supply-side control section 24 that controls sections of power supply apparatus 2.

Electric vehicle 3 can be charged in a non-contact manner by stopping in a predetermined range (hereinafter, referred to as "chargeable area B") on road surface A in FIG. 1. FIG. 1 shows an example where electric vehicle 3a is going to enter chargeable area B and electric vehicle 3b stops in the vicinity of electric vehicle 3a.

When electric vehicle 3a enters chargeable area B, power supply apparatus 2 sets up a communication with electric vehicle 3a and supplies power to electric vehicle 3a. At this time, it is necessary for power supply apparatus 2 to control a communication not to be set up with electric vehicle 3b stopping in the vicinity thereof. The sections of power supply apparatus 2 will be described in detail below.

Power supply section 21 generates power and supplies the generated power to electric vehicle 3 in a non-contact manner. It is preferable that power supply section 21 be installed in the vicinity of the road surface of a road.

Power supply section 21 includes a power supply coil and a coil driving circuit that drives the power supply coil. The coil driving circuit drives the power supply coil by applying a pulse of a predetermined frequency to the power supply coil. The predetermined frequency (chopper frequency) of the pulse is controlled by power supply-side control section 24. A magnetic field proportional to the current is generated in the power supply coil using the pulse as excitation current. An electromotive force is generated in the power receiving coil of power receiving section 41 by the magnetic field, and power is supplied from power supply section 21 to power receiving section 41.

Here, it is assumed that the magnitude of power supplied from power supply section 21 when electric vehicle 3 enters chargeable area B is defined as first power value Pa and the magnitude of power supplied from power supply section 21 after a communication between power supply apparatus 2 and electric vehicle 3 is set up is defined as second power value Pb. First power value Pa is such power as to have no influence on a human body. Here, the "such power as to have no influence on a human body" means such a small magnitude of power to have no influence on animals or the like present around power supply section 21. Second power value Pb means a magnitude which is larger than first power value Pa and which enables power receiving section 41 to charge power storage section 42. For example, first power value Pa is about several W to several tens W, and second power value Pb is about several kW to several tens kW.

Vehicle detecting section 22 is a sensor used to determine whether electric vehicle 3 enters chargeable area B. Vehicle detecting section 22 transmits the determination result on whether electric vehicle 3 enters chargeable area B to power supply-side control section 24.

Vehicle detecting section 22 includes, for example, an infrared sensor that detects whether an object is present within a predetermined distance. A plurality of the infrared sensors are disposed at facing positions on the boundary of chargeable area B. Vehicle detecting section 22 determines that electric vehicle 3 enters chargeable area B, when all the infrared sensors detect an object. In another example of vehicle detecting section 22, an imaging camera imaging a vehicle may be installed around the road and may detect that electric vehicle 3 enters or leaves chargeable area B by the use of an image captured with the imaging camera.

Power supply-side communication section 23 wirelessly communicates with vehicle-side communication section 43 of electric vehicle 3 to be described later. Power supply-side communication section 23 is controlled by power supply-side control section 24.

Power supply-side communication section 23 includes an antenna receiving RF waves and a modulation and demodulation section modulating or demodulating a received signal. Power supply-side communication section 23 is always supplied with power. It is preferable that power supply-side communication section 23 be installed around a surface of a road.

In the present invention, the communication method is not particularly limited, but a communication method of performing a short-distance communication of which the communication distance is several meters can be preferably used. This is because power supply-side communication section 23 needs only to be able to communicate with vehicle-side communication section 43 of electric vehicle 3 (electric vehicle 3 entering chargeable area B) to be supplied with power from power supply section 21, and needs to prevent a communication with electric vehicle 3b stopping in the vicinity of electric vehicle 3a to be supplied with power, for example, as shown in FIG. 1. Examples of the communication method applicable to the present invention include ZigBee (registered trademark), wireless LAN, and communications using specified low power bands.

Power supply-side control section 24 controls power supply section 21 on the basis of the detection result from vehicle detecting section 22 and information received by power supply-side communication section 23.

Specifically, when vehicle detecting section 22 detects that electric vehicle 3 enters chargeable area B, power supply-side control section 24 sets the magnitude of power to be supplied from power supply section 21 to first power value Pa. Power supply-side control section 24 then causes power supply-side communication section 23 to transmit and receive data in order to set up a communication between power supply-side communication section 23 and vehicle-side communication section 43. When the communication is set up, power supply-side control section 24 sets the magnitude of power to be supplied from power supply section 21 to second power value Pb. Details of the control performed by power supply-side control section 24 will be described later.

Power receiving apparatus 4 includes power receiving section 41 that receives power supplied from power supply section 21 of power supply apparatus 2, power storage section 42 that stores power received by power receiving section 41, vehicle-side communication section 43 that communicates with power supply-side communication section 23, and vehicle-side control section 44 that controls power receiving section 41 and vehicle-side communication section 43. The sections of power receiving apparatus 4 will be described in detail below.

Power receiving section 41 is installed on the bottom surface of the vehicle body of electric vehicle 3 and includes a power receiving coil and a rectifier circuit. It is preferable that power receiving section 41 is installed on the bottom surface of electric vehicle 3 facing the road.

The surface of the power receiving coil is covered with a synthetic resin or the like. The power receiving coil is a coil formed, for example, in a coplanar shape and can receive power from power supply section 21 through electromagnetic induction. The power received through electromagnetic induction is input to the rectifier circuit, is converted into DC current therein, and is output to power storage section 42.

Power storage section 42 stores power received by power receiving section 41. A secondary battery (such as a nickel-hydrogen secondary battery or a lithium ion secondary battery) having a high energy density or a capacitor having large capacity is used as power storage section 42. The power stored in power storage section 42 serves as a power source for driving the wheels of electric vehicle 3 and is used to operate an electric motor. The power stored in power storage section 42 is used as power for operating accessories such as a car navigation apparatus and a car audio apparatus, electrical components such as power windows, an ETC (registered trademark), and an ECU (Electronic Control Unit), and the like, in addition to the electric motor.

Vehicle-side communication section 43 wirelessly communicates with power supply-side communication section 23 of power supply apparatus 2. Vehicle-side communication section 43 is controlled by vehicle-side control section 44.

Vehicle-side communication section 43 includes an antenna for receiving RF waves and a modulation and demodulation section for modulating or demodulating a received signal. It is preferable that vehicle-side communication section 43 be installed on the bottom surface of electric vehicle 3 facing the road. Accordingly, the antenna is preferably a planar antenna not protruding from the bottom surface of electric vehicle 3.

In the present invention, the communication method is not particularly limited, but a communication method of performing a short-distance communication of which the communication distance is about several meters can be preferably used.

Vehicle-side communication section 43 is started up on the basis of power received by power receiving section 41. Specifically, vehicle-side communication section 43 is started when power of first power value Pa or more is supplied from power supply section 21 to power receiving section 41, and operates with the power output from power receiving section 41.

After being started up, vehicle-side communication section 43 performs a process of setting up a communication with power supply-side communication section 23. Vehicle-side communication section 43 operates with power received by power receiving section 41 until the communication is set up, and operates with power of power storage section 42 after the communication is set up.

Vehicle-side communication section 43 is in a communication standby state after the communication is set up. Since vehicle-side communication section 43 operates with power received by power receiving section 41 until the communication is set up, it is possible to start the communication without using the power of power storage section 42.

Vehicle-side control section 44 controls vehicle-side communication section 43 and power receiving section 41 of power receiving apparatus 4. Specifically, vehicle-side control section 44 controls power receiving section 41 to prepare reception of power and causes vehicle-side communication section 43 to transmit and receive data so as to set up a communication between power supply-side communication section 23 and vehicle-side communication section 43. Details of the control performed by vehicle-side control section 44 will be described later.

Vehicle-side control section 44 and power supply-side control section 24 include a CPU, a ROM, and a RAM. The CPU performs various operations, outputting of control signals, and the like by executing a program stored in the ROM. The CPU uses the RAM as a work area during execution of the program.

Figure 3:
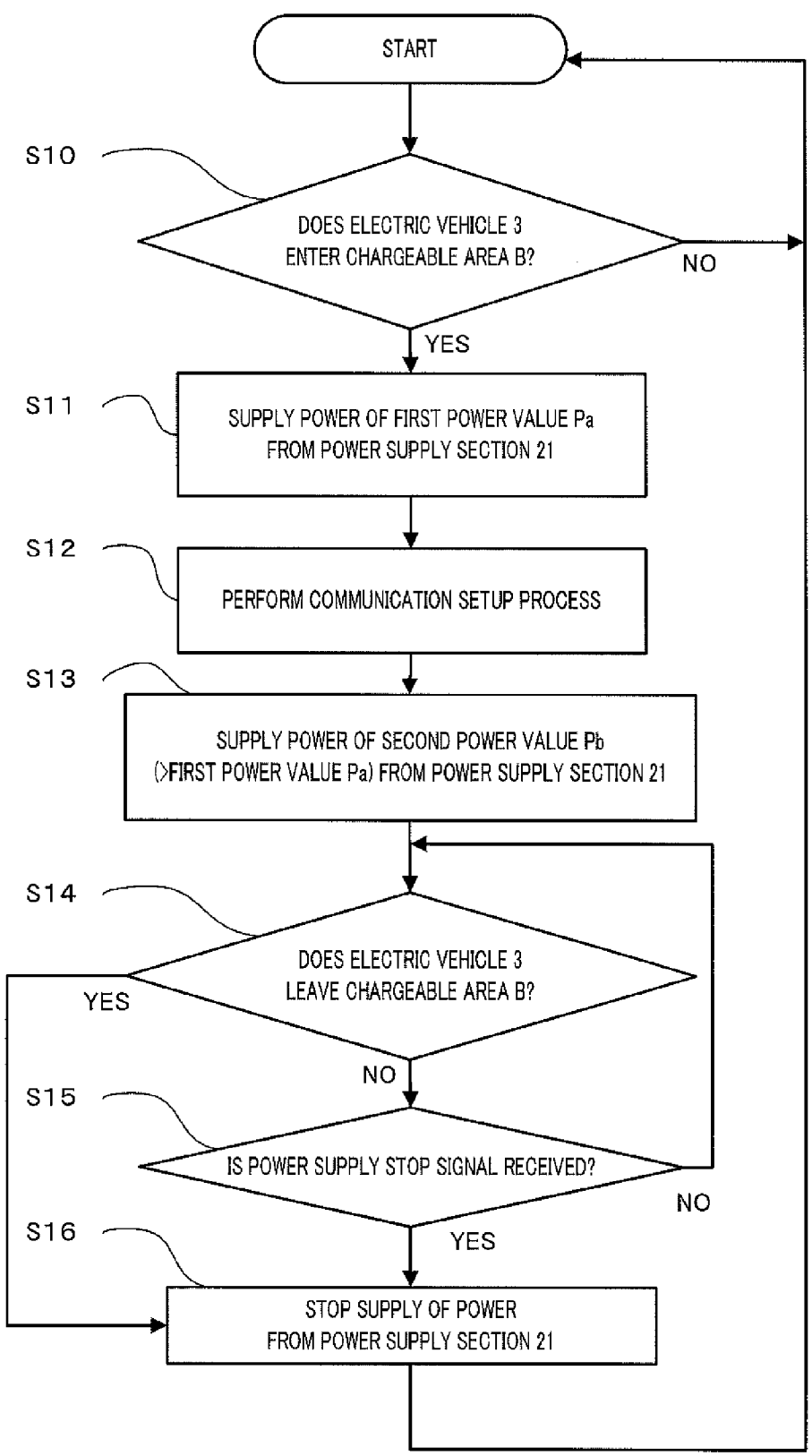
FIG. 3 is a diagram illustrating the operation of a power supply apparatus according to Embodiment 1 of the present invention.
Figure 4:
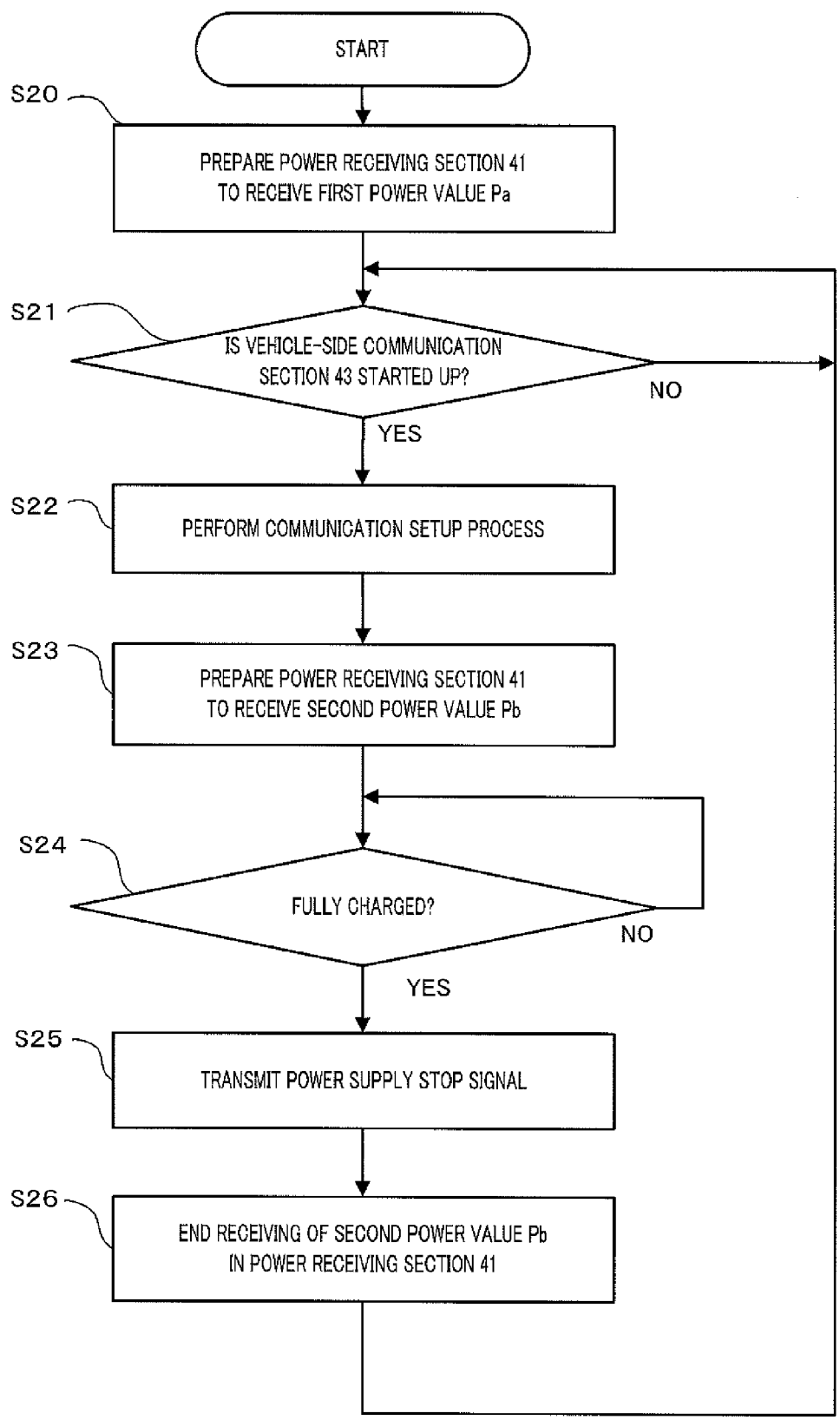
FIG. 4 is a diagram illustrating the operation of a power receiving apparatus according to Embodiment 1 of the present invention.
Figure 5:
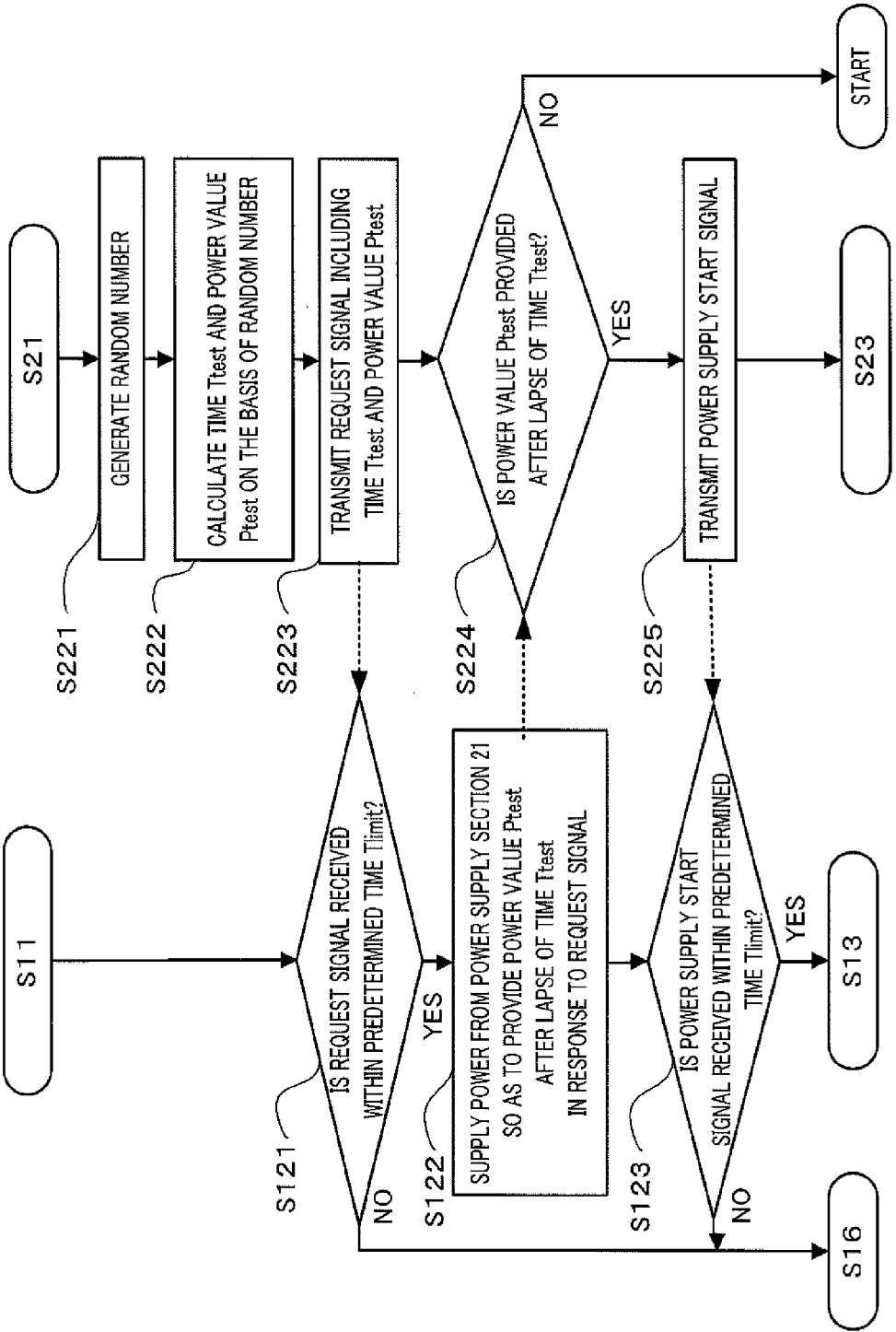
FIG. 5 is a diagram illustrating a communication setup process according to Embodiment 1 of the present invention.

The processing operations of the power supply system for an electric vehicle having the above-mentioned configuration will be described below with reference to FIG. 3 to FIG. 5. FIG. 3 is a diagram illustrating the operation of the power supply apparatus. FIG. 4 is a diagram illustrating the operation of the power receiving apparatus. FIG. 5 is a diagram illustrating a communication setup process.

First, the operation of the power supply apparatus will be described with reference to FIG. 3. In "start" of FIG. 3, power supply section 21 does not supply power.

Power supply-side control section 24 first determines whether electric vehicle 3 enters chargeable area B on the basis of the detection result from vehicle detecting section 22 (S10). When electric vehicle 3 does not enter chargeable area B (NO in S10), power supply-side control section 24 performs the process of S10 again.

When electric vehicle 3 enters chargeable area B (YES in S10), power supply-side control section 24 controls power supply section 21 so that power supply section 21 supplies power of first power value Pa (S11).

Power supply-side communication section 23 performs a process of setting up a communication with vehicle-side communication section 43 of electric vehicle 3 entering chargeable area B (S12). Details of this process will be described later.

After the communication is set up in S12, power supply-side control section 24 controls power supply section 21 so that power supply section 21 supplies power of second power value Pb (S13). When power supply section 21 supplies power of second power value Pb in S13, electric vehicle 3 starts receiving power.

After the supply of power is started in S13, power supply-side control section 24 determines whether electric vehicle 3 leaves chargeable area B (S14). When the electric vehicle leaves chargeable area B (YES in S14), power supply-side control section 24 causes power supply section 21 to stop the supply of power (S16). This process is performed regardless of whether the charging of electric vehicle 3 is ended. This is because when electric vehicle 3 is being charged but electric vehicle 3 moves for a certain reason, power supply section 21 supplying power of second power value Pb is exposed, which is dangerous.

When electric vehicle 3 does not leave chargeable area B (NO in S14), power supply-side control section 24 determines whether power supply-side communication section 23 receives a power supply stop signal from vehicle-side communication section 43 (S15). When the power supply stop signal is received (YES in S15), power supply-side control section 24 causes power supply section 21 to stop the supply of power (S16). On the other hand, when the power supply stop signal is not received (NO in S15), power supply-side control section 24 performs the process of S14 again. When the process of S16 is ended, the same state as "START" of FIG. 3 is obtained.

The operation of power receiving apparatus 4 will be described below with reference to FIG. 4.

First, vehicle-side control section 44 prepares power receiving section 41 to receive power of first power value Pa (S20). This preparation is a process for enabling power receiving section 41 to receive power. This preparation is started, for example, when the speed of a vehicle becomes lower than or equal to a predetermined speed. This is because the charging operation when a vehicle travels at a high speed cannot be normally considered.

When the process of S20 is ended, vehicle-side control section 44 determines whether vehicle-side communication section 43 is started up (S21). Vehicle-side communication section 43 is started up when power receiving section 41 receives power of first power value Pa. When vehicle-side communication section 43 is not started up (NO in S21), vehicle-side control section 44 repeatedly performs the process of S21.

After power receiving section 41 receives power of first power value Pa to start up vehicle-side communication section 43 (YES in S21), vehicle-side communication section 43 performs a process of setting up a communication with power supply-side communication section 23 of power supply apparatus 2 (S22). Details of this process will be described later.

When power receiving section 41 receives power of first power value Pa in S21 and S22, vehicle-side communication section 43 operates with power output from power receiving section 41.

After the communication is set up in S22, vehicle-side control section 44 prepares power receiving section 41 to receive power of second power value Pb (S23). This preparation includes, for example, a process of turning on a relay (not shown) connecting power receiving section 41 and power storage section 42.

After the communication is set up in S22, vehicle-side control section 44 switches the power source for vehicle-side communication section 43 so that vehicle-side communication section 43 operates with power supplied from power storage section 42 as a power source. This is because after the communication is set up once, it is preferable that the power source be switched to power storage section 42 which can stably supply power, to stabilize the communication.

When the process of S23 is ended, power receiving section 41 starts receiving power from power supply section 21. Vehicle-side control section 44 determines whether power storage section 42 is fully charged during the reception of power (S24).

When it is determined that power storage section 42 is not fully charged (NO in S24), vehicle-side control section 44 performs the process of S24 again after a predetermined time passes, in order for power receiving section 41 to consecutively receive power.

When it is determined that power storage section 42 is fully charged (YES in S24), vehicle-side control section 44 causes vehicle-side communication section 43 to transmit a power supply stop signal (S25). The power supply stop signal is a signal used for causing power supply section 2 to stop the supply of power of second power value Pb from power supply section 21. When the charging is continuously performed even after power storage section 42 is fully charged, overcharging occurs to cause overheating of power storage section 42 and degradation in lifetime. Therefore, the supply of power is stopped by the use of the power supply stop signal.

After transmitting the power supply stop signal, vehicle-side control section 44 performs a power reception ending process. Here, the power reception ending process includes, for example, a process of turning off a relay (not shown) connecting power receiving section 41 and power storage section 42.

The communication setup process will be described below with reference to FIG. 5. The left flowchart in FIG. 5 represents the power supply-side process (S12) and the right flowchart represents the vehicle-side process (S22).

After vehicle-side communication section 43 is started up in S21, vehicle-side control section 44 generates a random number (S221). Then, vehicle-side control section 44 generates predetermined time Ttest and predetermined power value Ptest on the basis of the random number (S222).

Predetermined time Ttest and predetermined power value Ptest are values to be set for power supply apparatus 2. Vehicle-side control section 44 determines that the communication with power supply apparatus 2 is set up when power supply section 21 provides power of predetermined power value Ptest after predetermined time Ttest passes.

Here, predetermined time Ttest is a time of about several seconds. When this time is excessively long, it takes a lot of time to start the supply of power. On the other hand, when this time is excessively short, power supply apparatus 2 cannot respond.

Predetermined power value Ptest is a value greater than first power value Pa and smaller than second power value Pb and is about several W to several tens kW. When power value Ptest is excessively great, the periphery of power supply section 21 is affected. When the power value is excessively small, vehicle-side communication section 43 cannot be started up.

For example, when it is assumed that vehicle-side control section 44 generates a random number of 8 bits (0 to 255) in S221, vehicle-side control section 44 can divide the above-mentioned preferable ranges of predetermined time Ttest and predetermined power value Ptest into 256 equal parts and select a numerical value corresponding to the generated random number. It is assumed that multiple power supply apparatuses 2 are installed in parallel and electric vehicles 3 stops on respective power supply apparatuses 2 and are charged. Then, when predetermined time Ttest and predetermined power value Ptest of neighboring vehicles are set to the same value, the correspondence between power supply apparatuses 2 and electric vehicles 3 may be erroneously determined. By using the random number, it is possible to actively avoid the state where predetermined time Ttest and predetermined power value Ptest of neighboring vehicles have the same values.

Vehicle-side control section 44 then generates a request signal including predetermined time Ttest and predetermined power value Ptest and causes vehicle-side communication section 43 to transmit the request signal (S223).

The request signal transmitted from vehicle-side communication section 43 is received by power supply-side communication section 23. Power supply-side control section 24 determines whether power supply-side communication section 23 receives the request signal within predetermined time Tlimit after power supply section 21 starts the supply of power of first power value Pa in S11 (S121). Predetermined time Tlimit is, for example, about several seconds.

When the request signal is not received within predetermined time Tlimit (NO in S121), power supply-side control section 24 causes power supply section 21 to stop the supply of power (S16). When it is considered that a vehicle passes through chargeable area B after the supply of power of first power value Pa is started, the subsequent supply of power of first power value Pa causes power waste. Therefore, when a response is not received within a predetermined time, it is preferable to determine that there is no power supply target and stop the supply of power.

When the request signal is received within predetermined time Tlimit (YES in S121), power supply-side control section 24 controls power supply section 21 on the basis of predetermined time Ttest and predetermined power value Ptest included in the request signal. Specifically, after predetermined time Ttest passes from when power supply-side communication section 23 receives the request signal, the power supplied from power supply section 21 is controlled to be predetermined power value Ptest (S122).

Vehicle-side control section 44 determines whether the power received by power receiving section 41 is predetermined power value Ptest after predetermined time Ttest passes from when transmitting the request signal (S224).

When the power is not power value Ptest (NO in S224), vehicle-side control section 44 determines that a communication with power supply apparatus 2 is not set up, and returns the process flow to START of FIG. 4.

On the other hand, when the power is predetermined power value Ptest (YES in S224), vehicle-side control section 44 determines that a communication between power supply-side communication section 23 and vehicle-side communication section 43 is set up, and performs a control for causing vehicle-side communication section 43 to transmit a power supply start signal (S225). Then, vehicle-side control section 44 performs the process of S23.

The power supply start signal transmitted from vehicle-side communication section 43 in S225 is received by power supply-side communication section 23. Power supply-side control section 24 determines whether the power supply start signal is received within predetermined time Tlimit after the supply of power in S122 is started (S123). When the power supply start signal is not received within predetermined time Tlimit (NO in S123), power supply-side control section 24 causes power supply section 21 to stop the supply of power (S16).

On the other hand, when the power supply start signal is received within predetermined time Tlimit (YES in S123), power supply-side control section 24 determines that a communication between power supply-side communication section 23 and vehicle-side communication section 43 is setup, and performs a control for causing power supply section 21 to supply power of second power value Pb in the process of S13. The reason of determining whether the power supply start signal is received within predetermined time Tlimit is the same as described in S121.

When the request signal is received within predetermined time Tlimit in S121 (YES in S121), power supply-side control section 24 may determine that a communication between power supply-side communication section 23 and vehicle-side communication section 43 is set up. In this case, the calculation of predetermined power value Ptest in S222 and the transmission of predetermined power value Ptest in S223 become unnecessary. Power supply-side control section 24 performs a control such that power supplied from power supply section 21 becomes second power value Pb after predetermined time Ttest passes from when the request signal is received in S122. When the supplied power is second power value Pb in S224, vehicle-side control section 44 determines that a communication between power supply-side communication section 23 and vehicle-side communication section 43 is set up. The processes of S225 and S123 are unnecessary.

Figure 6:
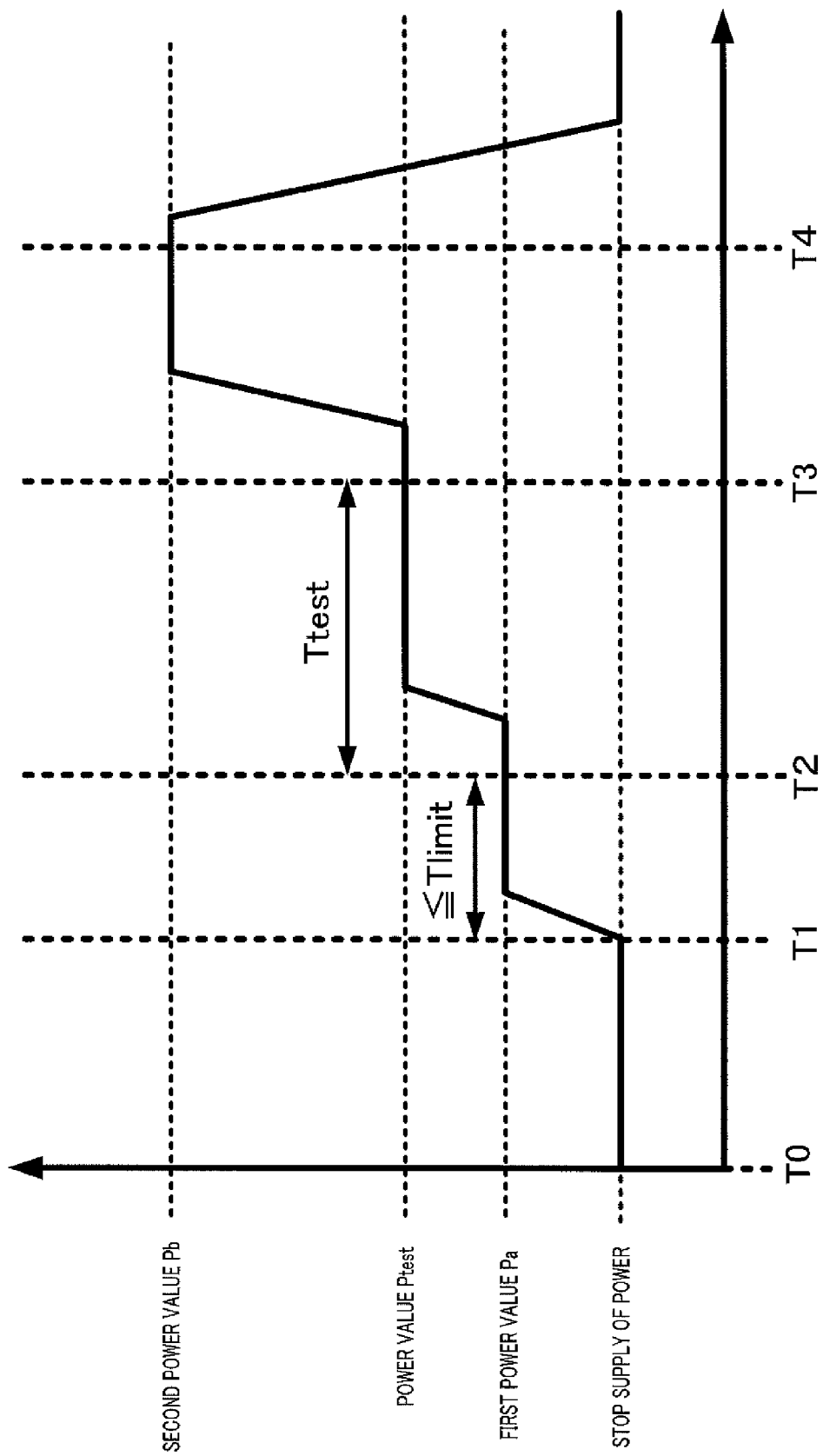
FIG. 6 is a timing diagram in Embodiment 1 of the present invention.

A variation in power value supplied from power supply section 21 will be described below with reference to FIG. 6. FIG. 6 is a timing diagram in Embodiment 1 of the present invention. Time T0 represents the "START" state of FIG. 3, and the power value supplied from power supply section 21 is zero at this time. Time T1 represents a state where a vehicle enters chargeable area B (YES in S10), and the magnitude of the power supplied from power supply section 21 is first power value Pa.

Since the magnitude of the power supplied from power supply section 21 is first power value Pa, vehicle-side communication section 43 is started up (YES in S21) and vehicle-side communication section 43 transmits a request signal (S223).

When power supply-side communication section 23 receives the request signal within predetermined time Tlimit after a vehicle enters chargeable area B at time T2 (S121), power supply-side control section 24 controls power supply section 21 so that the supplied power is set to predetermined power value Ptest included in the request signal at the time point where predetermined time Ttest included in the request signal passes from T2 to T3 (S122).

When it is confirmed that the supplied power is set to predetermined power value Ptest at the time point where predetermined time Ttest passes after the transmission of the request signal at time T3 (YES in S224), vehicle-side control section 44 transmits a power supply start signal (S225). Power supply-side control section 24 controls power supply section 21 so that the supplied power is set to second power value Pb from T3 to T4 (S123).

When the vehicle leaves chargeable area B (YES in S14), or when power storage section 42 is fully charged, power supply-side control section 24 causes power supply section 21 to stop the supply of power (after T4).

In this way, in the power supply system according to this embodiment, power supply-side control section 24 performs a control for causing power supply section 21 to supply power of first power value Pa when vehicle detecting section 22 detects that electric vehicle 3 enters chargeable area B. In this state, when it is determined that a communication between power supply-side communication section 23 and vehicle-side communication section 43 is set up, the system performs a control for causing power supply section 21 to supply power of second power value Pb.

Accordingly, it is possible to accurately associate electric vehicle 3 supplied with power from power supply apparatus 2, with electric vehicle 3 communicating with power supply apparatus 2.

Additionally, since vehicle-side communication section 43 of electric vehicle 3 is started up on the basis of first power value Pa smaller than second power value Pb for supplying power to electric vehicle 3, it is possible to improve safety without discharging high power to the periphery of power supply section 21 of power supply apparatus 2.

It has been stated in this embodiment that vehicle-side communication section 43 is operated with the power supplied to power receiving section 41 until a communication is set up and is operated with the power of power storage section 42 after the communication is set up. However, the present invention is not limited to this example, but vehicle-side communication section 43 may be always operated with power supplied from power storage section 42 as a power source. At this time, vehicle-side communication section 43 is started up with a signal indicating reception of power of first power value Pa or larger output from power receiving section 41 as a trigger. Accordingly, since vehicle-side communication section 43 can be always in a communication standby state, it is possible to shorten the time until a communication is started, compared with the case where vehicle-side communication section 43 is started up with power supplied from power receiving section 41.

It has been stated in this embodiment that in S223, vehicle-side control section 44 generates a request signal including predetermined time Ttest and predetermined power value Ptest generated in S222 and causes vehicle-side communication section 43 to transmit the generated request signal. However, the present invention is not limited to this example, but only any one of predetermined time Ttest and predetermined power value Ptest may be transmitted.

When only predetermined time Ttest is transmitted, the processes of S122 and S224 of FIG. 5 can be performed without any change by causing power supply apparatus 2 and power receiving apparatus 4 to share a predetermined value of predetermined power value Ptest.

When only predetermined power value Ptest is transmitted, power supply-side control section 24 controls power supply section 21 on the basis of predetermined power value Ptest included in the request signal just after receiving the request signal. Vehicle-side control section 44 determines whether the power received by power receiving section 41 is predetermined power value Ptest in S224, just after transmitting the request signal.

It is preferable that power receiving section 41 and vehicle-side communication section 43 be installed on the bottom surface of electric vehicle 3 facing the road, and power supply section 21 and power supply-side communication section 23 be installed in the vicinity of the road surface of the road.

Accordingly, only by locating electric vehicle 3 on the road surface in which power supply section 21 and power supply-side communication section 23 are installed, vehicle-side communication section 43 can be easily started up. Since electric vehicle 3 serves as a shielding member, it is possible to prevent a communication with a different electric vehicle.

(Embodiment 2)

Figure 7:
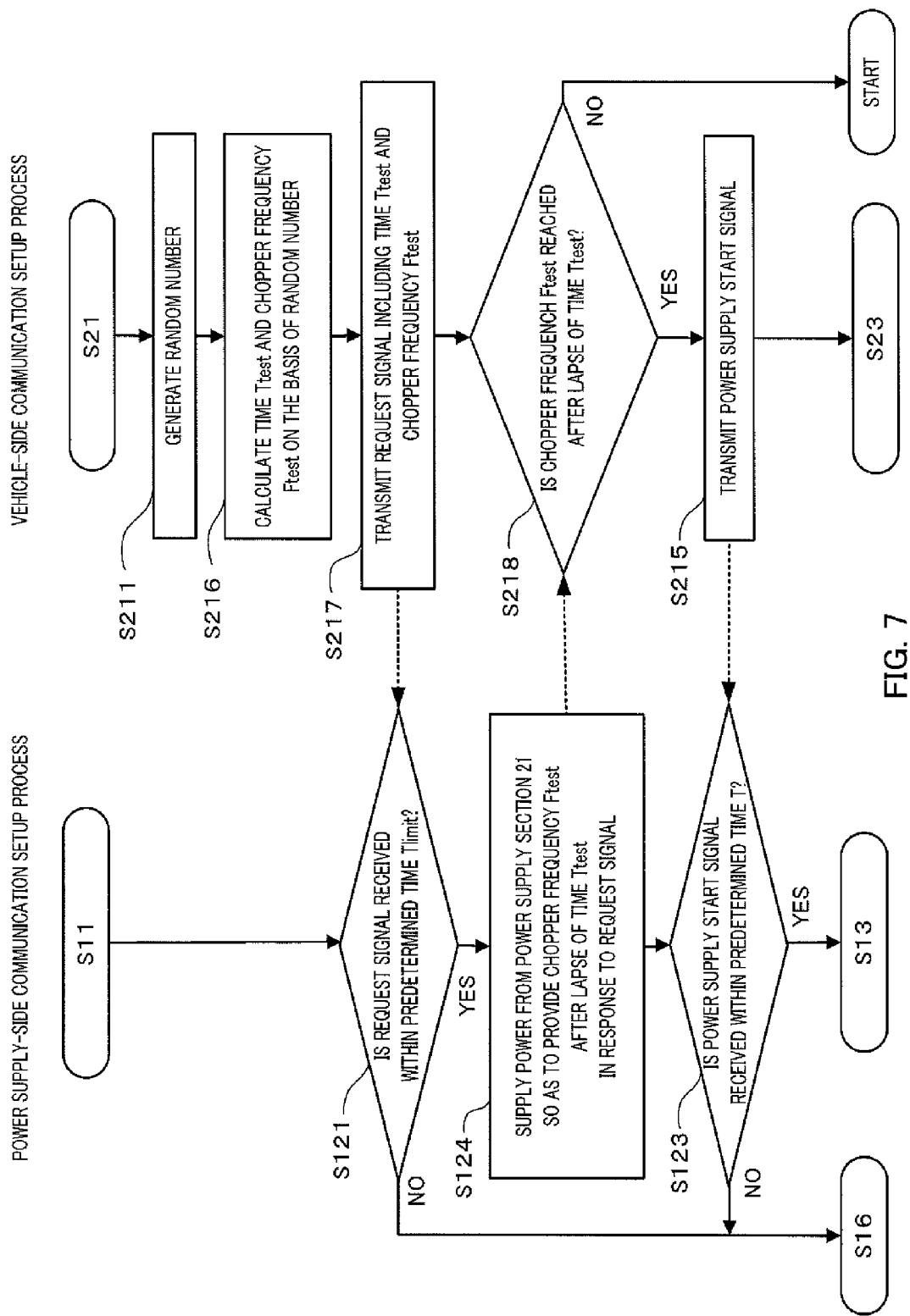
FIG. 7 is a diagram illustrating a communication setup process according to Embodiment 2 of the present invention.

Hereinafter, a power supply system for an electric vehicle according to Embodiment 2 of the present invention will be described with reference to FIG. 7. FIG. 7 is a diagram illustrating a communication setup process in Embodiment 2 of the present invention. In FIG. 7, the same steps as described with reference to FIG. 5 in Embodiment 1 will be referenced by the same reference numerals and description thereof will not be repeated.

Embodiment 2 is different from Embodiment 1, in that it is determined whether a communication is set up on the basis of chopper frequency Ftest instead of power value Ptest in Embodiment 1.

The chopper frequency is an ON-OFF cycle of current when AC current is generated from a DC power source by repeating ON-OFF of current. Vehicle-side control section 44 can acquire chopper frequency Ftest by measuring the output of power receiving section 41 through the use of a dedicated measuring circuit.

As shown in FIG. 7, vehicle-side control section 44 calculates time Ttest and chopper frequency Ftest on the basis of a random number (S216) subsequently to S211 as described above, and causes vehicle-side communication section 43 to transmit a request signal including time Ttest and chopper frequency Ftest (S217).

Power supply-side control section 24 performs a control for causing power supply section 21 to supply power so as to achieve chopper frequency Ftest after time Ttest passes, in response to the request signal received by power supply-side communication section 23 (S124).

Vehicle-side control section 44 determines whether the power received by power receiving section 41 in time Ttest after the transmission of the request signal has chopper frequency Ftest (S218). When it is determined that the power has chopper frequency Ftest (YES in S218), vehicle-side control section 44 determines that a communication is set up and causes vehicle-side communication section 43 to transmit a power supply start signal (S215).

As described above, the power supply system according to this embodiment determines whether a communication is set up on the basis of chopper frequency Ftest. When power value Ptest is measured as described in Embodiment 1, the absolute value of power is measured and an error may therefore be included in the power due to attenuation dependent on the distance. On the other hand, the measured value of chopper frequency Ftest does not depend on the distance but is constant. Accordingly, it is possible to reduce the measurement error in comparison with the case where power value Ptest is used, by using chopper frequency Ftest.

It has been stated in this embodiment that vehicle-side control section 44 generates the request signal including predetermined time Ttest and chopper frequency Ftest generated in S216 and causes vehicle-side communication section 43 to transmit the generated request signal in S217. However, the present invention is not limited to this example, but only any one of predetermined time Ttest and chopper frequency Ftest may be transmitted.

When only predetermined time Ttest is transmitted, the processes of S124 and S218 of FIG. 7 can be performed without any change by causing power supply apparatus 2 and power receiving apparatus 4 to share a predetermined value of chopper frequency Ftest.

When only chopper frequency Ftest is transmitted, power supply-side control section 24 controls power supply section 21 on the basis of chopper frequency Ftest included in the request signal just after receiving the request signal. Vehicle-side control section 44 determines whether the power received by power receiving section 41 has chopper frequency Ftest in S218, just after transmitting the request signal.

(Embodiment 3)

Figure 8:
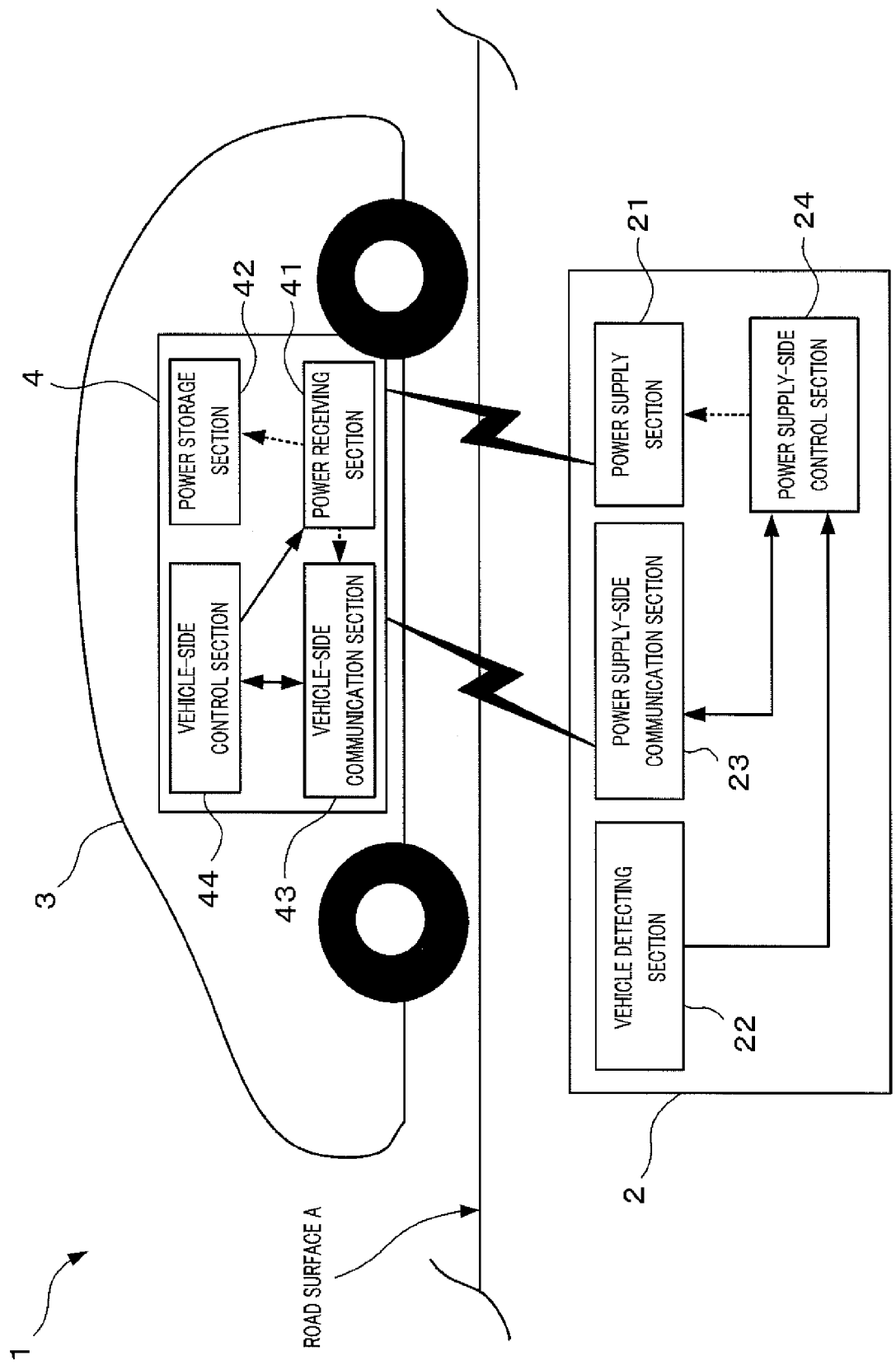
FIG. 8 is a block diagram illustrating the configuration of a power supply system for an electric vehicle according to Embodiment 3 of the present invention.

Hereinafter, a power supply system for an electric vehicle according to Embodiment 3 of the present invention will be described with reference to FIG. 8. FIG. 8 is a block diagram illustrating the configuration of the power supply system for an electric vehicle according to Embodiment 3 of the present invention. In FIG. 8, solid arrows represent the flow of signals and dotted arrows represent the flow of power. In FIG. 8, the same elements as described with reference to FIG. 2 in Embodiment 1 will be referenced by the same reference numerals and description thereof will not be repeated.

It has been stated in Embodiment 1 that vehicle-side communication section 43 is operated with power received by power receiving section 41 until a communication is set up between vehicle-side communication section 43 and power supply-side communication section 23, and is operated with power stored in power storage section 42 as a power source after the communication is set up. On the contrary, in Embodiment 3, vehicle-side communication section 43 is always operated with power received by power receiving section 41 as a power source. Accordingly, in FIG. 8, the supply of power from power storage section 42 to vehicle-side communication section 43 in FIG. 2 is deleted.

In Embodiment 1, vehicle-side communication section 43 is operated with power of power storage section 42 after a communication is set up. This means that the power which is first received by power receiving section 41 and then stored in power storage section 42 is used. When power is once stored in power storage section 42 and the power is used, loss is necessarily caused in the power.

In Embodiment 3, since power is directly supplied from power receiving section 41 to vehicle-side communication section 43 without storing the power in power storage section 42 after a communication is set up, it is possible to operate vehicle-side communication section 43 with small power loss.

(Embodiment 4)

Figure 9:
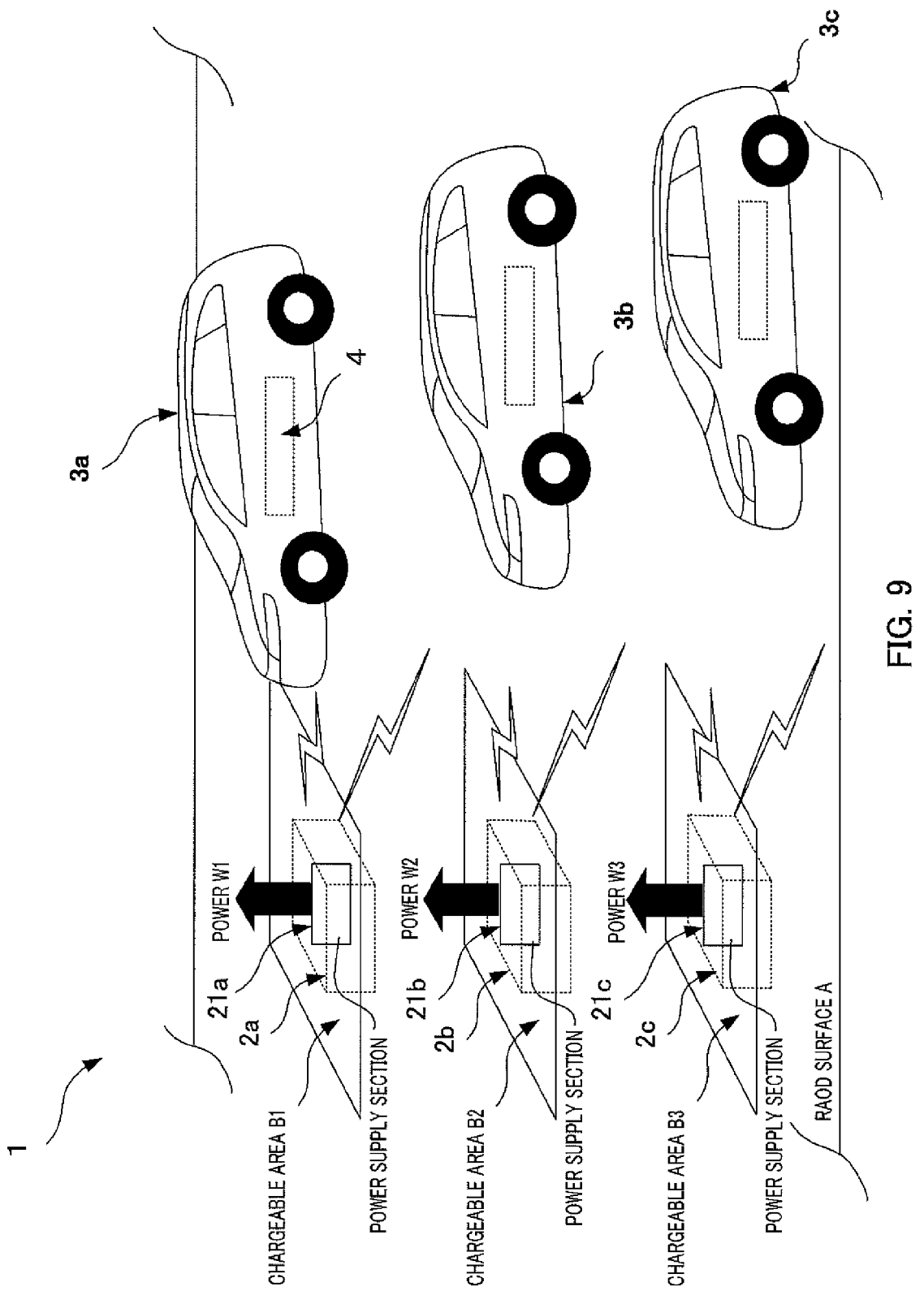
FIG. 9 is a diagram illustrating the configuration of a power supply system for an electric vehicle according to Embodiment 4 of the present invention.
Figure 10:
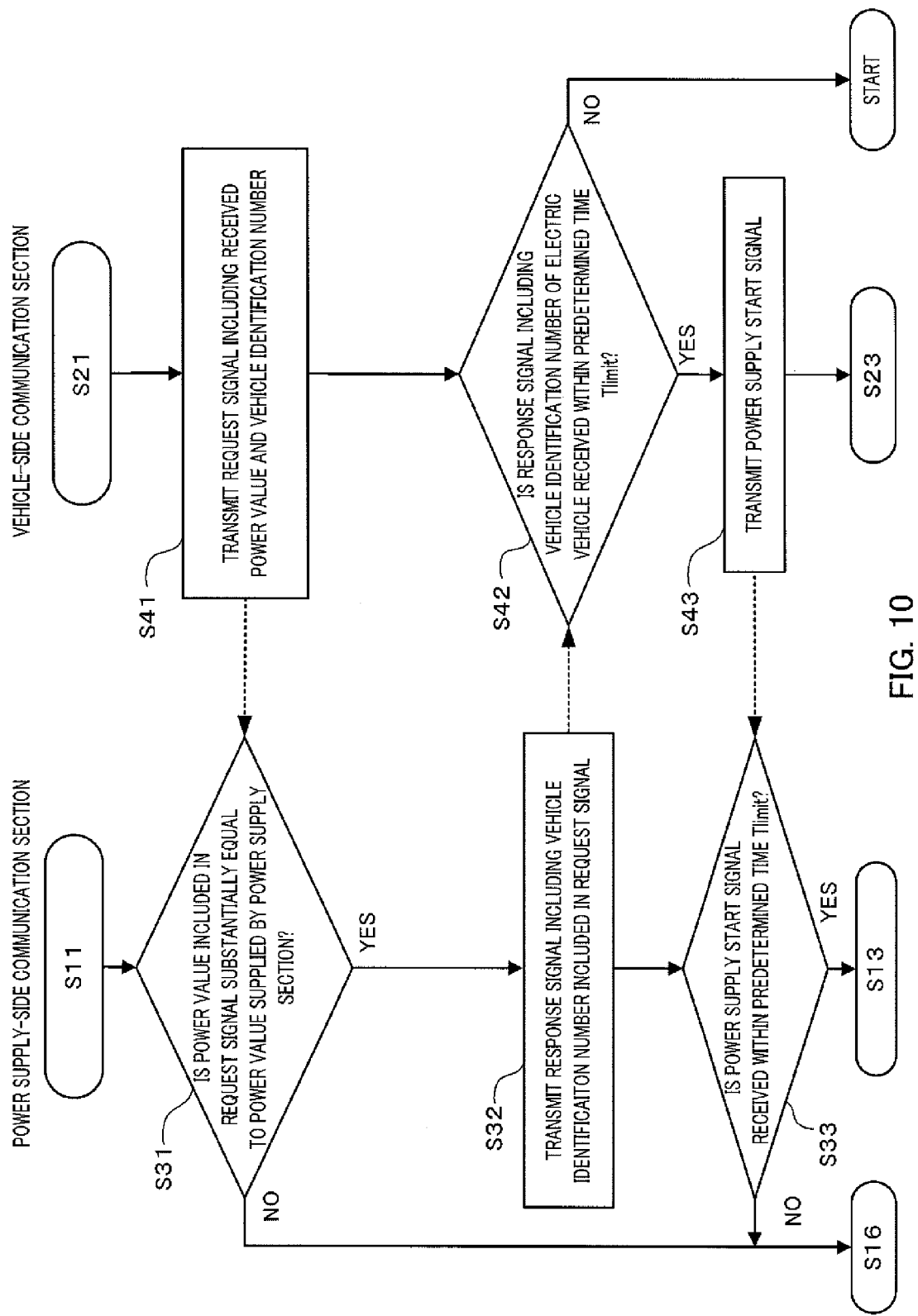
FIG. 10 is a diagram illustrating a communication setup process according to Embodiment 4 of the present invention.

In Embodiment 4, an example where multiple power supply apparatuses supply power of first power values pa different from one another will be described. Hereinafter, a power supply system for an electric vehicle according to Embodiment 4 of the present invention will be described with reference to FIG. 9 and FIG. 10. FIG. 9 is a diagram illustrating the configuration of the power supply system for an electric vehicle according to Embodiment 4 of the present invention. FIG. 10 is a diagram illustrating a communication setup process in Embodiment 4 of the present invention. The configurations of power supply apparatus 2 and power receiving apparatus 4 in this embodiment are the same as described with reference to FIG. 2 in Embodiment 1.

In FIG. 9, three power supply apparatuses 2$a$, 2$b$, and 2$c$ are shown. Power supply section 21$a$ of power supply apparatus 2$a$ supplies power of first power value Pa1 to electric vehicle 3$a$ when electric vehicle 3$a$ enters chargeable area B1. Power supply section 21$b$ of power supply apparatus 2$b$ supplies power of first power value Pa2 to electric vehicle 3$b$ when electric vehicle 3$b$ enters chargeable area B2. Power supply section 21$c$ of power supply apparatus 2$c$ supplies power of first power value Pa3 to electric vehicle 3$c$ when electric vehicle 3$c$ enters chargeable area B3. First power values Pa1, Pa2, and Pa3 are about several W to several tens W and are different from each other.

The communication setup process will be described below with reference to FIG. 10. The left flowchart in FIG. 10 represents a power supply-side process (S12) and the right flowchart represents a vehicle-side process (S22).

After vehicle-side communication section 43 is started up in S21, vehicle-side control section 44 generates a request signal including the power value received by power receiving section 41 and a vehicle identification number and causes vehicle-side communication section 43 to transmit the generated request signal (S41).

The request signal transmitted from vehicle-side communication section 43 is received by power supply-side communication section 23. Power supply-side control section 24 determines whether the power value included in the request signal is substantially equal to first power value pa supplied from power supply section 21 in S11 (S31). The term "substantially equal" means that the power value included in the request signal belongs to a predetermined range including first power value Pa.

When the power value included in the request signal is not equal to first power value pa supplied from power supply section 21 (NO in S31), power supply-side control section 24 causes power supply section 21 to stop the supply of power (S16). This is because it is thought in this case that electric vehicle 3 supplied with power from power supply apparatus 2 is not matched with electric vehicle 3 communicating with power supply apparatus 2.

When the power value included in the request signal is substantially equal to first power value Pa supplied from power supply section 21 (YES in S31), power supply-side control section 24 generates a response signal including the vehicle identification number included in the request signal and causes power supply-side communication section 23 to transmit the generated response signal (S32). In this case, it is thought that the electric vehicle supplied with power from the power supply apparatus is matched with the electric vehicle communicating with the power supply apparatus.

Vehicle-side control section 44 determines whether vehicle-side communication section 43 receives the response signal including its own vehicle identification number before predetermined time Ttest passes from when transmitting the request signal (S42).

When the response signal is not received (NO in S42), vehicle-side control section 44 determines that a communication with power supply apparatus 2 is not set up and returns the flow of processes to START of FIG. 4.

When the response signal is received (YES in S42), vehicle-side control section 44 determines that a communication is set up between power supply-side communication section 23 and vehicle-side communication section 43, and performs a control for causing vehicle-side communication section 43 to transmit a power supply start signal (S43). Then, vehicle-side control section 44 performs the process of S23.

The power supply start signal transmitted from vehicle-side communication section 43 in S43 is received by power supply-side communication section 23. Power supply-side control section 24 determines whether the power supply start signal is received within predetermined time Tlimit after the supply of power in S11 is started (S33). When the power supply start signal is not received within predetermined time Tlimit (NO in S33), power supply-side control section 24 causes power supply section 21 to stop the supply of power (S16).

When the power supply start signal is received within predetermined time Tlimit (YES in S33), power supply-side control section 24 determines that a communication is set up between power supply-side communication section 23 and vehicle-side communication section 43, moves the flow of processes to S13, and performs a control for causing power supply section 21 to supply power of second power value Pb.

As described above, in the power supply system according to this embodiment, power supply-side control section 24 performs a control for causing power supply section 21 to supply power of first power value Pa when vehicle detecting section 22 detects that electric vehicle 3 enters chargeable area B. At this time, power supply sections 21a, 21b, and 21c supply power of first power values Pa (Pa1, Pa2, and Pa3) different from each other. In this state, when determining that a communication is set up between power supply-side communication section 23 and vehicle-side communication section 43, power supply-side control section 24 performs a control for causing power supply section 21 to supply power of second power value Pb.

Accordingly, it is possible to accurately associate electric vehicle 3 supplied with power from power supply apparatus 2, with electric vehicle 3 communicating with power supply apparatus 2.

In this embodiment, first power values Pa (Pa1, Pa2, and Pa3) may be fixedly assigned to power supply apparatuses 2 (2a, 2B, and 2C), respectively, or may be assigned to power supply apparatuses 2 (2a, 2B, and 2C) in patterns determined depending on the time for supplying power, respectively. The patterns of first power values Pa differ depending on power supply apparatuses 2.

In this case, vehicle-side control section 44 generates a request signal including the pattern of first power value Pa received by power receiving section 41 instead of generating the request signal including the power value received by power receiving section 41 in S41. When the pattern of first power value Pa included in the request signal is substantially equal to the pattern of first power value pa supplied from power supply section 21 of power supply apparatus 2 in S32, power supply-side control section 24 generates a response signal including the vehicle identification number included in the request signal and causes power supply-side communication section 23 to transmit the generated response signal.

First power values Pa (Pa1, Pa2, and Pa3) may vary in power receiving section 41 due to positional mismatch between power supply section 21 and power receiving section 41. By causing the first power value Pa to temporally vary in patterns different depending on power supply apparatuses 2, it is possible to accurately associate therewith electric vehicle 3 communicating with power supply apparatus 2 with temporal variation of the power value, even when variation occurs in the absolute value of first power value Pa received by power receiving section 41.

The disclosure of Japanese Patent Application No. 2010-223759, filed on Oct. 1, 2010, including the specification, drawings and abstract, is incorporated herein by reference in its entirety.

INDUSTRIAL APPLICABILITY

The present invention can be suitably used for a power supply system for an electric vehicle that supplies power from a power supply apparatus to an electric vehicle in a non-contact manner, and an electric vehicle and a power supply apparatus that are used for the system.

REFERENCE SIGNS LIST

1 Power supply system for electric vehicle
2 Power supply apparatus
21 Power supply section
22 Vehicle detecting section
23 Power supply-side communication section
24 Power supply-side control section
3 Electric vehicle
4 Power receiving apparatus
41 Power receiving section
42 Power storage section
43 Vehicle-side communication section
44 Vehicle-side control section

The invention claimed is:

1. A power supply system for a vehicle that supplies power from a power supply apparatus to a vehicle equipped with a power storage section in a non-contact manner,
  wherein the vehicle includes
    a vehicle-side communication section that wirelessly communicates with the power supply apparatus,
    a power receiving section that is supplied with power from the power supply apparatus in a non-contact manner, and
    the power storage section that stores power received by the power receiving section,
  wherein the power supply apparatus includes
    a power supply-side communication section that wirelessly communicates with the vehicle-side communication section of the vehicle,
    a power supply section that supplies power to the power receiving section of the vehicle in a non-contact manner, and
    a power supply-side control section that controls the power supply section, and wherein the power supply-side control section
performs a control for causing the power supply section to supply power of a first power value,
wherein the vehicle-side communication section transmits a request signal when determining that the power supply section is supplying power of the first power value, and
wherein the power supply-side control section
determines that a communication is set up between the power supply-side communication section and the vehicle-side communication section when the power supply-side communication section receives the request signal while the power supply section is supplying power of the first power value; and
performs a control for causing the power supply section to supply power of a second power value greater than the first power.

2. The power supply system according to claim 1, wherein the first power values are set to be different from each other depending on the respective power supply apparatuses,
wherein the vehicle-side communication section transmits a request signal including the power value received by the power receiving section and a vehicle identification number of the vehicle in a state where the power supply section is supplying power of the first power value,
wherein the power supply-side communication section transmits a response signal including the vehicle identification number when the power value included in the request signal is in a predetermined range including the first power value,
wherein the vehicle-side communication section transmits a power supply start signal when receiving the response signal within a predetermined time after transmitting the request signal, and
wherein the power supply-side control section determines that a communication is set up between the power supply-side communication section and the vehicle-side communication section when the power supply-side communication section receives the power supply start signal.

3. The power supply system according to claim 1, wherein the first power values are set to temporally vary in patterns different from each other depending on the power supply apparatuses,
wherein the vehicle-side communication section transmits a request signal including the pattern of the first power value received by the power receiving section and a vehicle identification number of the vehicle in a state where the power supply section is supplying power of the first power value,
wherein the power supply-side communication section transmits a response signal including the vehicle identification number when the pattern of the first power value included in the request signal is the pattern of the power supply apparatus,
wherein the vehicle-side communication section transmits a power supply start signal when receiving the response signal within a predetermined time after transmitting the request signal, and
wherein the power supply-side control section determines that a communication is set up between the power supply-side communication section and the vehicle-side communication section when the power supply-side communication section receives the power supply start signal.

4. The power supply system according to claim 1, wherein the vehicle-side communication section is started up with power of the first power value supplied from the power supply section of the power supply apparatus to the power receiving section.

5. The power supply system according to claim 1, wherein the power storage section stores power of a second power value supplied from the power supply section to the power receiving section.

6. The power supply system according to claim 1, wherein the power supply apparatus further includes a vehicle detecting section that detects an entrance of the vehicle to a predetermined area, and
wherein the power supply-side control section performs a control for causing the power supply section to supply power of the first power value when the vehicle detecting section detects the entrance of the vehicle to the predetermined area.

* * * * *